United States Patent Office 3,421,504
Patented Jan. 14, 1969

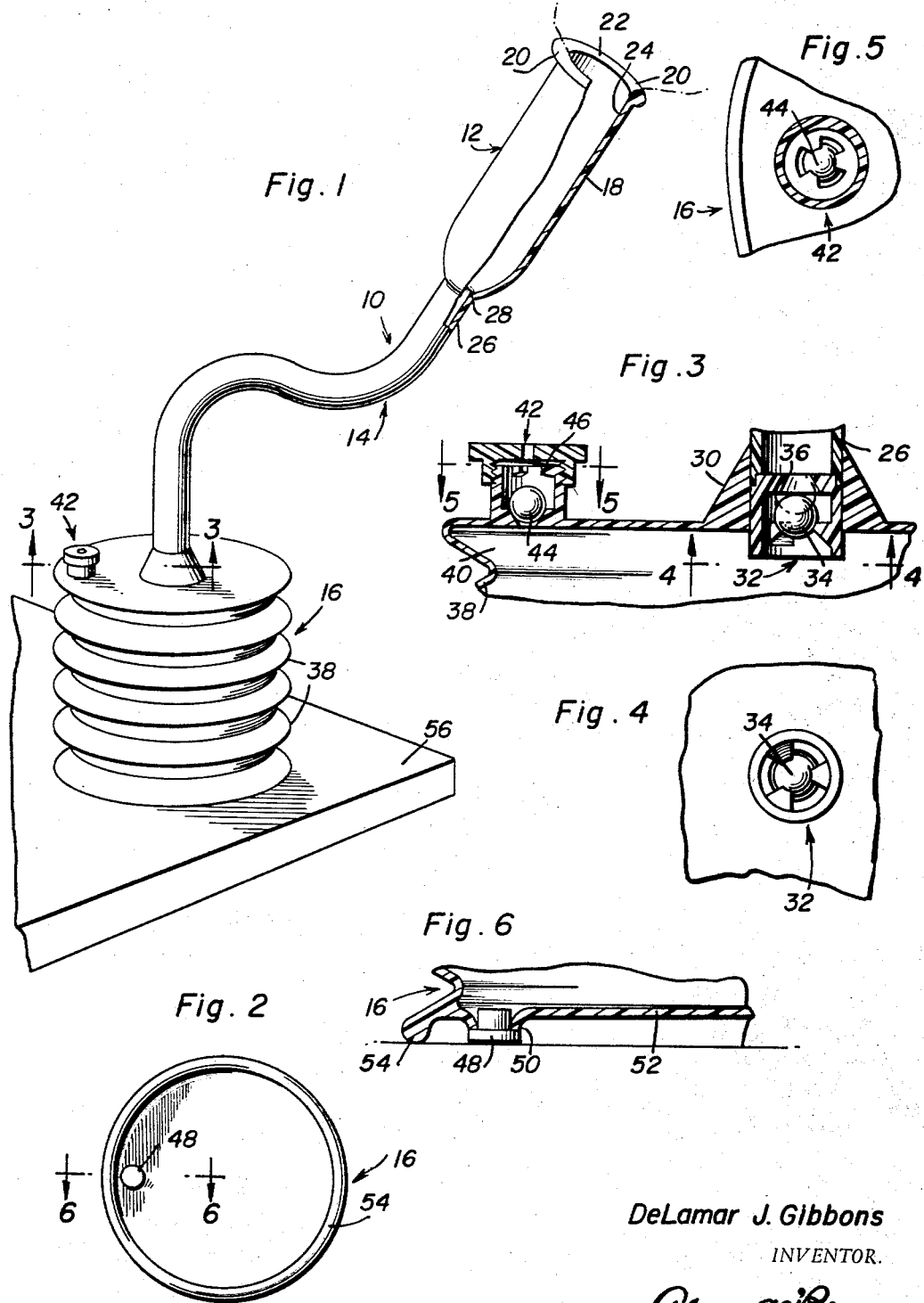

3,421,504
VACUUM RECEPTOR
De Lamar J. Gibbons, Box 404, Blanding, Utah 84511
Filed Jan. 25, 1966, Ser. No. 522,958
U.S. Cl. 128—278                                     6 Claims
Int. Cl. A61m 1/00

ABSTRACT OF THE DISCLOSURE

An elongated sheath-like container closed at one end and constructed of fluid impervious elastic material such as a suitable latex-type rubber. The container is adapted to endwise receive a male organ therein with the free end of the organ seated in the closed end of the container and to inherently contract about the organ. One end of a flexible but stiff conduit having an inside diameter of approximately 3/16" opens centrally through and is sealingly attached to the closed end of the container and the other end of the conduit is adapted to be communicated with a source of vacuum.

---

This invention relates generally to a vacuum appliance, and more specifically to a vacuum receptor for male organs. It is an object of this invention to provide means for assisting in the evacuation or clearing of the urinary tract when voluntary evacuation thereof has been rendered impossible, such as occurs in various diseases and/or medical operations concerning the urinary tract.

It is another object of the present invention to provide a vacuum receptor of the type useful for clearing the male urinary tract.

It is another object of the present invention to provide a vacuum receptor which is extremely simple to use, including a minimum of moving parts and hence being relative trouble free in operation.

It is a further object of the present invention to provide a vacuum receptor which may be readily applied to a male organ and which includes means for insuring that once so applied, the receptor will not fall off or be otherwise unintentionally removed.

It is a still further object of the present invention to provide a vacuum receptor which includes a sheath-like container which is retained on the male organ by vacuum and/or adhesive and sealing effect of an adhesive coating on the interior of the sheath.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, partially in cross-section illustrating the vacuum receptor comprising the present invention;

FIGURE 2 is a bottom plan view of the bellows portion of the present invention;

FIGURE 3 is an enlarged partial vertical sectional view taken substantially on the plane of the line 3—3 of FIGURE 1;

FIGURE 4 is a bottom plan view taken substantially on the plane of the line 4—4 of FIGURE 3;

FIGURE 5 is a horizontal sectional view taken substantially on the plane of the line 5—5 of FIGURE 3; and FIGURE 6 is an enlarged partial vertical sectional view taken substantially on the plane of the line 6—6 of FIGURE 2.

Referring now more specifically to the drawings, reference numeral 10 generally denotes the vacuum receptor comprising the present invention. The receptor 10 includes a container generally referred to by the reference numeral 12 for receiving the male organ, a conduit generally denoted by reference numeral 14 connected at one end to the container 12 and at the other end to a bellows generally denoted by reference numeral 16.

Referring to FIGURE 1 in particular, it will be observed that the container 12 comprises a sheath-like flexible walled container 18 having an enlarged rolled end 20. The container 18 is preferably fabricated of a suitable latex type rubber material such as conventionally used for forming surgical gloves and the like. The enlarged rolled end 20 is provided to enable the container 18 to be readily positioned on a male organ, the rolled edge 20 defining the periphery of an opening 22 in a first end of the container. The container 18 is coated on the entire inner peripheral surfaces thereof with a suitable adhesive coating 24 such as benzoin gum or the like in order to aid in retaining the container 18 in place on the male organ when the device is in use as well as aiding in sealing the container 18 on the organ during operation of the device.

Referring again to FIGURE 1, it will be observed that the conduit 14 comprises an elongate curved tubing 26 which is preferably round in cross-section and is preferably semi-rigid in construction. Thus, it will be appreciated that the tubing 26 may be fabricated of a semi-rigid plastic or other suitable lightweight material. It will be appreciated that the tubing 26 is suitably connected at its upper end to an opening 28 in the lower end of the container 18, the tubing 26 thereby being in fluid communication with the container through the opening 28.

The tubing 26 is connected at the other end to a centrally located neck 30 on the bellows 16, the neck 30 including a suitable one-way valve 32 therein which will, of course, allow air to pass only from the tubing 26 into the bellows by virtue of the ball member 34 and valve seat 36. The bellows 16 is preferably fabricated of plastic or other suitable lightweight flexible material and, of course, includes a plurality of accordion-like folds 38 therein whereby the interior chamber 40 of the bellows may be varied in size in order to form a vacuum or suction effect when manipulated. Referring to FIGURES 1 and 3 in particular, it will be observed that a second one-way valve 42 is provided on the bellows 16, the valve including the ball member 44 and valve seat 46 which allow air to pass out of the chamber 40 when the bellows is compressed, but which precludes the entrance of air into the chamber 40 when the bellows 16 is relaxed. It will be readily apparent that the interaction of the valves 32 and 42 permit the bellows to be operated as a vacuum pump or suction source.

Referring now to FIGURES 2 and 6 in particular, it will be observed that the bellows 16 has a discharge plug 48 in normal closing relationship in an opening 50 in the bottom wall 52 of the bellows, the bellows including a peripherally extending leg 54, thereby enabling the bellows to be placed on an upright surface such as the table 56 for use thereof notwithstanding the placement of the plug 48 in the bottom thereof.

It will be readily apparent from the foregoing description that the vacuum receptor is especially useful in unblocking or clearing the male urinary tract in order to permit evacuation thereof when such evacuation has been rendered otherwise impossible. Thus, it will be apparent that the male organ is placed in the sheath-like container 18, the container 18 having an open end 22 in order to receive the male organ, and a flexible wall in order to be readily applied thereto. Further, the aforementioned adhesive coating 24 is applied on the interior surfaces of the container whereby the container, when placed on the male organ may not be unintentionally removed. Thus, it will be apparent that the flexible sheath-like container 18 may be retained on the male organ by the adhesive, and/or by vacuum, inasmuch as the adhesive coating effectively seals the container to the male organ. Further, this sealing enables the device to be more effectively used inasmuch as it ensures the application of a vacuum or suction to the male organ as the bellows 16 is manipulated. Further, the tubing 26 operates both as a means for communicating the bellows 16 with the container 18 for application of suction to the container 18 and as a fluid conveyor for the urine drawn from the male organ, the urine being conveyed through the conduit 14 into the bellows 16. Thus, when the operation of the device has been completed, the drainage plug 48 enables the bellows 16 to be drained. In order for the receptor 10 to work properly, it is important that the tubing 26 have a semi-rigid construction and be of fairly large internal diameter, on the order of $3/16$ of an inch or larger, in order to properly apply suction to the container 18 as well as to provide proper drainage for the container when evacuation of the urinary tract is accomplished by the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vacuum receptor appliance for effecting evacuation of the male urinary tract, said appliance comprising a flexible wall sheath-like container constructed of fluid impervious elastic material, said container adapted to receive a male organ, means for retaining said container in place on the male organ, a conduit communicating at one end with said container, a vacuum source at the other end of said conduit for withdrawing air from said conduit and said container whereby evacuation of the male urinary tract may be accomplished, said retaining means comprising an adhesive coating on the interior of said container.

2. The combination of claim 1 wherein said container is constructed of a latex type rubber material.

3. The combination of claim 1 wherein said container includes an enlarged reinforced lip about one end thereof for enabling said container to be readily applied to a male organ.

4. A vacuum receptor appliance for effecting evacuation of the male urinary tract, said appliance comprising a flexible wall elongated sheath-like container closed at one end and constructed of fluid impervious elastic material, said container being adapted to endwise receive a male organ therein with the free end of said organ seated in the closed end of the container and to inherently contract about said organ, a conduit having one end opening centrally through and sealingly attached to said closed end of said container with said one end of said conduit structurally reinforcing said closed end of said container and disposed for positioning immediately outwardly of and in alignment with the outlet end of said urinary tract, a vacuum source communicated with the other end of said conduit, said conduit being constructed of a flexible material stiffer than the material of which said container is constructed and having sufficient stiffness so as not to collapse under atmospheric pressure when the interior of said conduit has a partial vacuum formed therein and so as not to allow the portions of the closed end of the container to which said one end of said conduit is attached to collapse when subjected to external atmospheric pressures and an internal partial vacuum, the walls of said container, being adapted to form a fluid-tight seal between said organ and said container when the interior of the latter is placed under partial vacuum.

5. The combination of claim 4 including an adhesive coating on the inner surfaces of said container.

6. The combination of claim 4 wherein said conduit has an inside diameter of approximately $3/16''$.

References Cited

UNITED STATES PATENTS

| 822,092 | 5/1906 | Woodruff | 128—294 |
| 2,389,831 | 11/1945 | Welsh | 128—294 |
| 2,947,470 | 8/1960 | Ruben et al. | 128—278 |
| 3,032,038 | 5/1962 | Swinn | 128—295 |
| 3,058,627 | 10/1962 | Eskridge | 128—278 |
| 3,112,061 | 11/1963 | Breer | 128—278 |
| 3,161,197 | 12/1964 | Glas et al. | 128—295 |
| 3,201,111 | 8/1965 | Afton | 128—278 |
| 3,349,768 | 10/1967 | Keane | 128—276 |

CHARLES F. ROSENBAUM, *Primary Examiner.*

U.S. Cl. X.R.

128—299, 295